United States Patent [19]

Ellis

[11] Patent Number: 5,341,959
[45] Date of Patent: Aug. 30, 1994

[54] BAG EMPTYING ARRANGEMENT

[75] Inventor: Peter J. Ellis, Salford, Great Britain

[73] Assignee: Bagfilla Overseas Limited, Derbyshire, England

[21] Appl. No.: 82,795

[22] Filed: Jun. 28, 1993

[30] Foreign Application Priority Data

Jul. 1, 1992 [GB] United Kingdom ............... 9214015

[51] Int. Cl.⁵ .............................................. B65D 33/00
[52] U.S. Cl. .................................. 222/105; 222/181
[58] Field of Search ............... 222/105, 181, 183, 185, 222/527, 529; 141/312, 314, 65, 114

[56] References Cited

U.S. PATENT DOCUMENTS

| | | | |
|---|---|---|---|
| 2,852,045 | 9/1958 | Goodner | 141/314 |
| 3,707,172 | 12/1972 | Obara | 141/68 X |
| 4,165,023 | 8/1979 | Schmit | 222/183 X |
| 4,595,126 | 6/1986 | Holmes | 222/105 |
| 4,790,708 | 12/1988 | von Bennigsen-Mackiewicz et al. | 222/181 X |
| 4,825,913 | 5/1989 | Stott | 141/93 X |
| 4,863,065 | 9/1989 | Decrane | 222/105 X |
| 4,946,071 | 8/1990 | Poulton | 222/185 X |
| 4,966,311 | 10/1990 | Taylor | 222/181 X |
| 5,184,759 | 2/1993 | Gill et al. | 222/181 |

*Primary Examiner*—Kevin P. Shaver
*Attorney, Agent, or Firm*—Charles J. Brown

[57] ABSTRACT

There is disclosed a bag emptying arrangement, for bulk dry material bags with outlet spouts in which a bag is supported, spout lowermost, and inserted into a tube atop a valve. The tube has an inner annulus and a pinch mechanism so that the spout can be passed over the annulus and pinched between it and the tube to seal the spout to the tube.

7 Claims, 1 Drawing Sheet

BAG EMPTYING ARRANGEMENT

This invention relates to bag emptying arrangements, especially to such arrangements for bulk dry material bags with outlet spouts in which a bag is supported spout lowermost and then a bag tie is released to allow the contents to fall through the spout.

The spout is inserted into a tube atop a valve, such as a rotary valve, for controlled discharge of the bag contents, and there may also be provided a choke arrangement for the spout which effects a controlled restriction.

It is a problem when loading a full bag into such an arrangement that with the spout in place in the tube, when the bag is first opened, the contents hit what is effectively a blind end to the tube and blow back up the tube in a rush of displaced air.

The present invention overcomes that problem.

The invention comprises a bag emptying arrangement, for bulk dry material bags with outlet spouts in which a bag is supported, spout lowermost, and inserted into a tube atop a valve, in which the tube has an inner annulus and pinch means so that the spout can be passed over the annulus and pinched against it to seal the spout to the tube.

The inner annulus may be supported from the valve end of the tube, and may be supported on a spider inside the tube and on a rod extending upwardly therefrom. The inner annulus may have a frame over which the spout end can be guided.

The pinch means may comprise bladder means, inflatable by a pressure air supply.

The inner annulus may be in a tube extension attached to the tube by a flexible attachment.

One embodiment of a bag emptying arrangement according to the invention will now be described with reference to the accompanying drawings, in which.

Figures 1, 2:
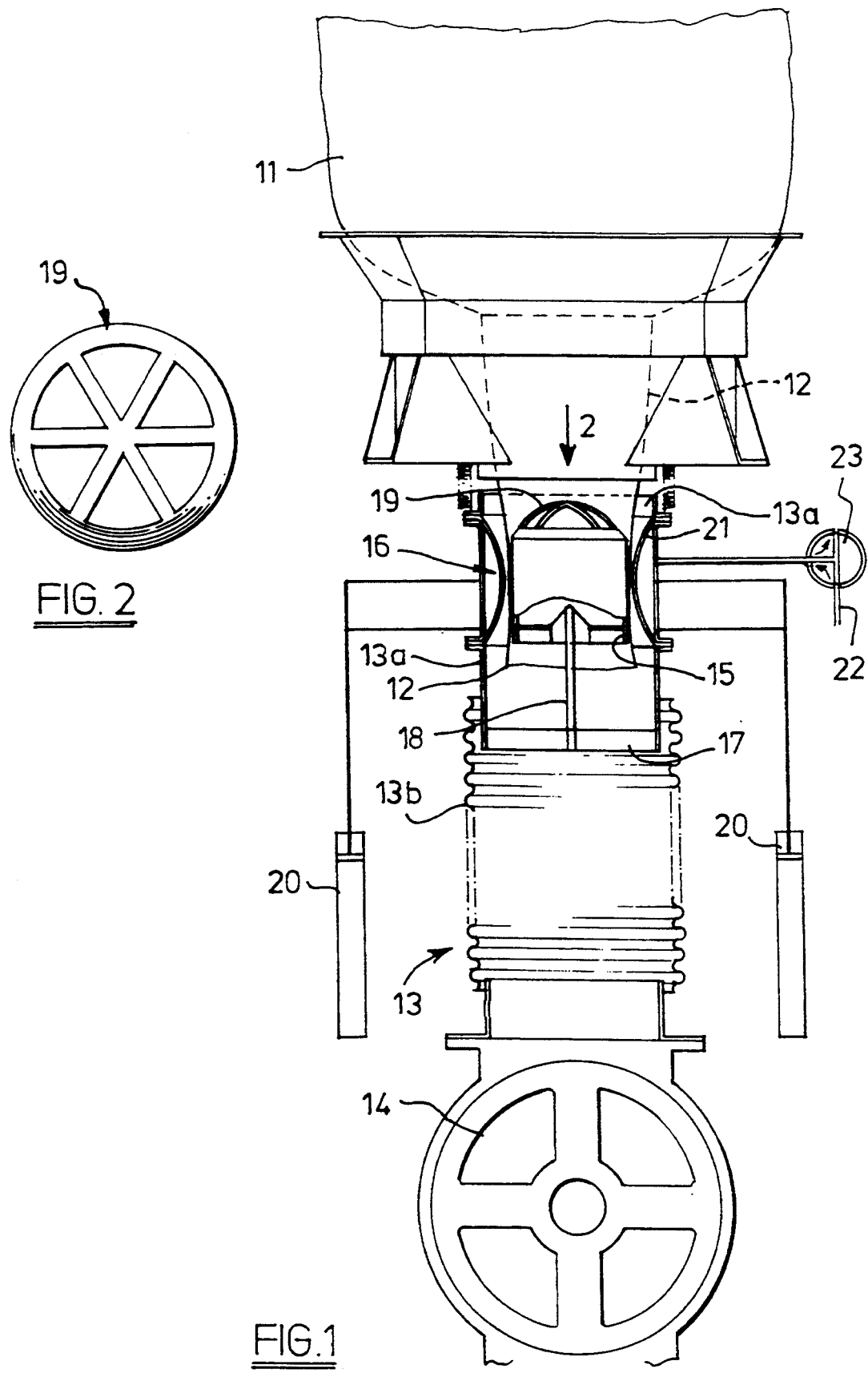
FIG. 1 is a part-sectional elevation.
FIG. 2 is a view (to a larger scale) on Arrow 2 of FIG. 1.

The drawings illustrate a bag emptying arrangement for a bulk dry material bag 11 with an outlet spout 12. The bag 11 is supported with spout 12 lowermost and inserted into a tube 13 atop a valve 14.

Ordinarily, with the tube thus placed, a tie on the bag is opened so that the contents drop through the spout. With the valve closed, however, air is displaced explosively up the tube 13. If the material is powderous, the air carries with it a considerable quantity of the material which flies into the operator's face and which can be dangerous.

According to the invention, however, the tube 13 has an upper portion 13a provided with an inner annulus 15 and pinch means 16 so that the spout 12 can be passed over the annulus 15 and pinched to seal the spout 12 to the tube 13. This prevents any blow back out of the top of the tube 13.

The inner annulus 15 is pivotally supported from the valve end of the tube 13 on a spider 17 inside the upper portion 13a and a rod 18 extending upwardly therefrom. The inner annulus 15 has a frame 19 over which the spout end 12 can be guided.

The pivotal connection facilitates fitting the spout over the annulus.

The pinch means 16 comprises bladder means 21 inflatable by a pressure air supply 22 controlled by a valve 23 that can supply pressure to pinch the spout 12 against the inner annulus 15 and then close off the pressure and vent the bladder means 21 to atmosphere when it is required to release the spout 12 to change the bag.

The tube portion 13a is attached to the lower part of the tube 13 by a flexible bellows like attachment 13b.

The portion of the tube 13a above the flexible attachment 13b is supported by pneumatic cylinders 20 which can be operated to raise the portion to an operative position after the spout 12 has been fitted over the inner annulus 15 and before the pinch means is operated. The cylinders 20 are allowed to bleed to atmosphere to enable the portion 13a to drop as the spout tends to extend as the bag emptying proceeds.

Where a pressure air supply may not be available, it is possible to fit a motor or hand pump arrangement to work the bladder means 21, which may be worked hydraulically or pneumatically, or a mechanical arrangement such as an iris arrangement or even an elastic ring or a strap, which may be less convenient to operate than a pressure air arrangement, but still effective.

I claim:

1. Apparatus for emptying a bag containing dry bulk material and having a lowermost spout comprising
   a) a downwardly extending tube having an upper end portion into which the spout is insertable,
   b) a valve at a lower end portion of the tube for controlling material flow therethrough,
   c) a spider within the tube lower end portion,
   d) a rod extending upwardly from the spider,
   e) an inner annulus on the rod within and spaced from the tube upper end portion to be within the spout inserted in the tube upper end portion, and
   f) pinch means within the tube upper end portion for selectively pinching the spout against the annulus to seal the spout to the tube.

2. Apparatus according to claim 1 wherein the inner annulus includes a frame over which the spout is guidable.

3. Apparatus according to claim 1 wherein the inner annulus is supported pivotally on the end of the rod.

4. Apparatus according to claim 1 wherein the tube includes an extensible bellows-like intermediate portion between its upper and lower end portions.

5. Apparatus according to claim 4 including pneumatic cylinder means for raising the tube upper end portion to operative position with respect to the spout and for lowering the tube upper end portion as the bag empties.

6. Apparatus according to claim 1 wherein the pinch means comprises selectively inflatable bladder means.

7. Apparatus for emptying a bag containing dry bulk material and having a lowermost spout comprising
   a) a downwardly extending tube having an upper end portion into which the spout is insertable,
   b) a valve at a lower end portion of the tube for controlling material flow therethrough,
   c) an extensible bellows-like intermediate potion included in the tube between its upper and lower end portions,
   d) pneumatic cylinder means for raising the tube upper end portion to operative position with respect to the spout and lowering the tube upper end portion as the tube empties,
   e) a spider within the lower end portion,
   f) a rod extending upwardly from the spider,
   g) an inner annulus pivotally supported on the rod within and spaced from the tube upper end portion to be within the spout inserted in the tube upper end portion, and
   h) pinch means comprising selectively inflatable bladder means within the tube upper end portion for selectively pinching the spout against the annulus to seal the spout to the tube.

* * * * *